No. 12,285. REISSUED NOV. 15, 1904.
G. O. M. OLSSON.
APPARATUS FOR REGULATING THE SPEED OF STEAM TURBINES.
APPLICATION FILED OCT. 1, 1904.
2 SHEETS—SHEET 1.
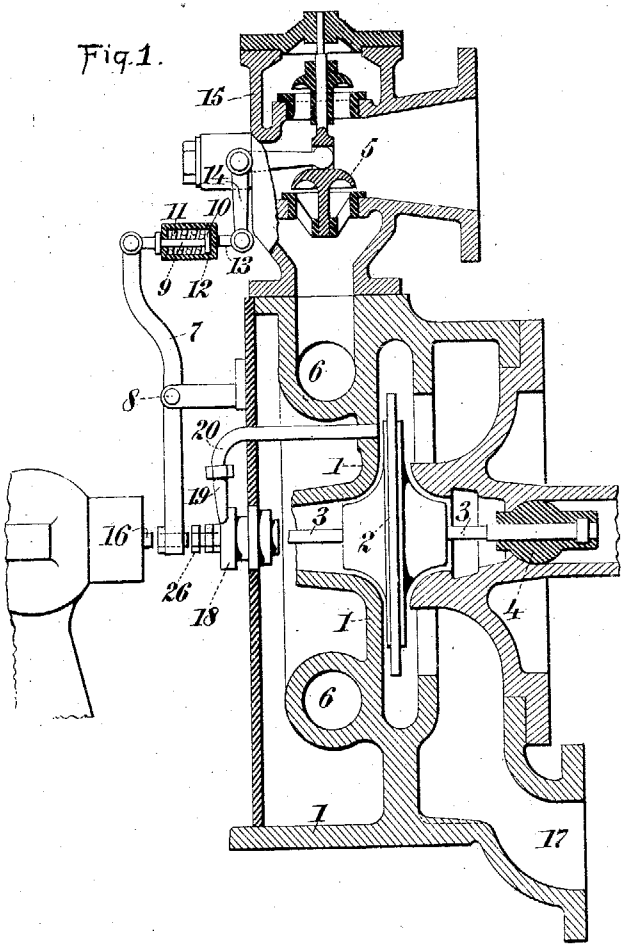
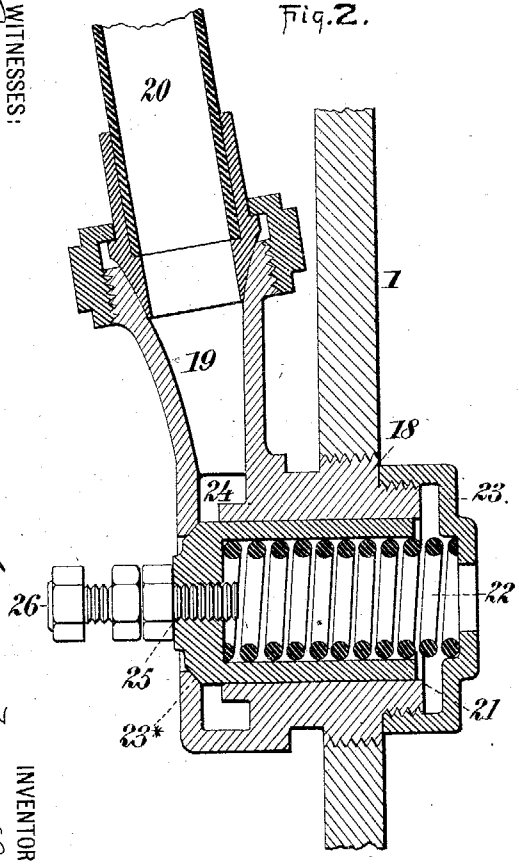
WITNESSES:
Gustave Dietetich
Edwin N. Dietetich.
INVENTOR
Georg Oscar Magnus Olsson
BY Lauh Benjamin
ATTORNEY No. 12,285. REISSUED NOV. 15, 1904.

G. O. M. OLSSON.

APPARATUS FOR REGULATING THE SPEED OF STEAM TURBINES.

APPLICATION FILED OCT. 1, 1904.

2 SHEETS—SHEET 2.

WITNESSES:

Gustave Dietrich.

Edwin H. Dietrich.

INVENTOR

Georg Oscar Magnus Olsson

BY Carl Benjamin his ATTORNEY

No. 12,285. Reissued November 15, 1904.

UNITED STATES PATENT OFFICE.

GEORG OSCAR MAGNUS OLSSON, OF STOCKHOLM, SWEDEN, ASSIGNOR TO THE DE LAVAL STEAM TURBINE COMPANY, A CORPORATION OF NEW JERSEY.

APPARATUS FOR REGULATING THE SPEED OF STEAM-TURBINES.

SPECIFICATION forming part of Reissued Letters Patent No. 12,285, dated November 15, 1904.

Original No. 701,500, dated June 3, 1902. Application for reissue filed October 1, 1904. Serial No. 226,865.

*To all whom it may concern:*

Be it known that I, GEORG OSCAR MAGNUS OLSSON, a subject of the King of Sweden and Norway, residing at Stockholm, Sweden, have invented a new and useful Improvement in Apparatus for Controlling the Speed of Steam-Turbines, of which the following is a specification.

Steam-turbines of the well-known De Laval type are commonly provided with an automatic centrifugal regulator, which controls the speed by controlling the steam admission to the wheel in accordance with the load. When the load is removed, the throttle-valve is closed and no steam is admitted to the turbine-wheel. Nevertheless it frequently happens that through the presence of dirt or other foreign matter or because of wear the said valve slightly leaks when closed by the regulator. When the steam-turbine is used with a condenser, the effect of such leakage is serious, inasmuch as a very small admittance of steam to the wheel is sufficient to increase the speed of the latter beyond the tolerated degree, this for the reason that the wheel when the load is removed meets with substantially no resistance from the medium in which it rotates.

The object of the present invention is to prevent this undue increase of speed.

My invention consists in the apparatus herein described whereby such abnormal speeding of the wheel due to steam leakage is prevented by the admission of air into the vacuum-chamber inclosing the wheel, said air then offering resistance to the motion of the wheel sufficient to reduce its velocity to the desired extent.

Figure 5:
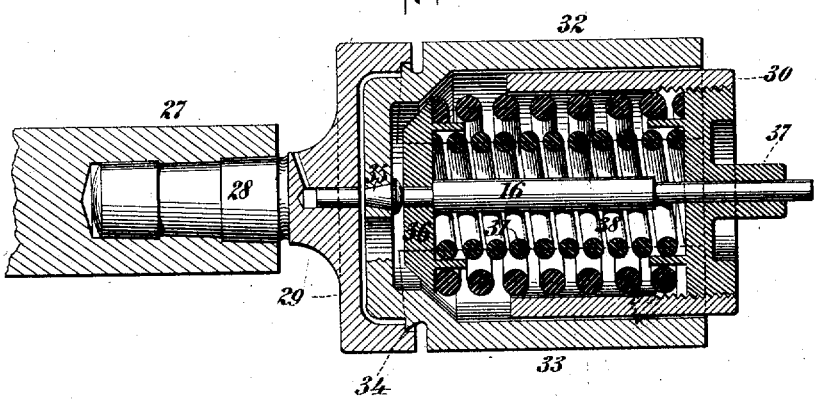
Figure 3:
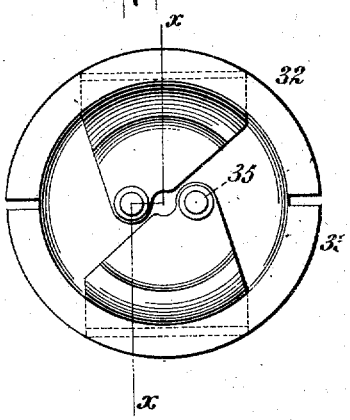

In the accompanying drawings, Figure 1 is a vertical section of a steam-turbine of said De Laval type exhibiting my apparatus applied thereto, and Fig. 2 is an enlarged vertical section of the air-controlling valve. Fig. 3 is an end view of the weights used in a form of regulator which is adapted to control the pin 16 in the manner hereinafter described. Fig. 4 is a longitudinal section of said regulator on the line *x x* of Fig. 3.

Similar numbers of reference indicate like parts.

1 represents the casing; 2, the steam-turbine wheel thereof. Said wheel is mounted on a shaft 3, journaled in bearings, one of which is shown at 4, the other bearing and adjacent parts being broken away in Fig. 1 to show the arrangement of the air-valve. At 5 is a throttle-valve communicating with the channel 6, and this channel leads to one or more steam-nozzles by which steam is delivered to the wheel. The arrangement of nozzles is well known in connection with turbines of the description referred to, and is therefore not illustrated.

7 is a lever having its fulcrum in a stud 8, which projects from the casing 1. The upper end of this lever is connected to the piston-rod 9, which carries the piston 10. This piston is contained in a cylinder 12, which is supported on the rod 13. Between the piston 10 and the end of the cylinder and also surrounding the piston-rod is a coiled spring 11. The rod 13 is connected to one arm of the bell-crank lever 14, the end of the other arm of which is received in a recess in the stem of the throttle-valve 5. The lower end of lever 7 is situated directly opposite a horizontal moving pin 16. This pin is actuated by a regulator, one form of which is shown in Figs. 3 and 4, so that when the pin 16 is moved to the right of Fig. 1 the valve 5 is closed and the steam is shut off, thus diminishing the speed of the turbine-wheel. On the other hand, when the pin 16 is moved to the left the valve 5 is lifted, thus admitting more steam to the turbine and augmenting its speed. A regulating device for actuating the pin 16 in the manner described is represented in Figs. 3 and 4.

27 is a shaft which is rotated by any suitable gearing from the turbine-wheel shaft. Into a recess in the end of this shaft is inserted the tapered shank 28 of the regulator-body. Said body consists of a recessed circular portion 29, a ring portion 30, and connecting-arms 31, one of which is indicated by dotted lines in Fig. 4.

32 and 33 are two arc-shaped weights surrounding the ring 30 and of bell-crank form, each having a knife-edge 34, by which it is fulcrumed in the circular portion 29 of said body, and each having a pin 35, which bears against the disk 36. Said disk is carried by the pin 16. Within the ring 30, which is threaded, is a nut 37, through which the pin 16 passes. A helical spring 38 is interposed between disk 36 and nut 37. By operating the nut the pressure of said spring is regulated, and said spring also serves to keep the weights closed in upon the body. When the limit of speed of the turbine, and hence of the shaft 27, is exceeded, the weights 32 33 spread apart by centrifugal force and in so doing move their pins 35 against the disk 36, and the latter moves the pin 16 outwardly and to an extent proportionate to the speed. When the speed diminishes, the pin 16 is moved inwardly by the action of the spring 37. The regulator may be provided with a casing, as shown in Fig. 1.

All of the foregoing construction except the cylinder 12, piston 10, and spring 11, interposed between rods 7 and 13, is old and well known.

After the steam has been cut off through closing of the throttle-valve 5 by means of such a regulator as is represented in Figs. 3 and 4 a possible leakage of steam around the throttle-valve may take place. My present device is intended for use when a vacuum is produced within the wheel-chamber. Such a condition occurs when, for example, a condenser is connected to the wheel-casing by the pipe 17. The steam-turbine then running in what is practically a vacuum meets with substantially no resistance from the medium in which it rotates. On the other hand, the constant inflow of a small quantity of steam leaking past the throttle is a constant force, and therefore an accelerating one. Hence all the conditions are present for causing the wheel rapidly to work up to a very high degree of speed, which for obvious reasons is disadvantageous and injurious. My method of preventing this difficulty consists in the admission of a small amount of air into the wheel-chamber, the effect of which is at once to provide a medium which will offer sufficient resistance to the motion of the wheel to overcome the force tending to rotate the wheel derived from the small amount of leaking steam. This admission of air I preferably cause to be done automatically. One embodiment of my aforesaid method is shown in an automatic apparatus, which I will now describe.

In the wall of the turbine-casing is screwed a hollow block 18, the interior of which block is connected to the interior of the wheel-chamber by means of the pipe 20. The block 18 has a cylindrical bore, in which is placed a hollow cylindrical valve 21. Within said valve is a coiled spring 22, one end of which bears against the nut 23, screwed on the rear end of block 18. The closed end of the piston is beveled on its outer surface at 23* and is seated in a correspondingly-beveled opening 24 in the wall of the block 18. In said closed end of the piston is screwed a pin 25, having head 26. This head 26 comes directly opposite the lower end of the lever 7, or, in other words, the lower end of lever 7 is interposed between the moving pin 16 of the regulator and the head 26 of the stem 25 of the valve 21.

The operation of the apparatus is as follows: Assume that the load on the steam-turbine is removed and the throttle-valve 5 closed by the action of the regulator-pin 16. If now steam leaks past the throttle-valve 5, the speed of the turbine 2 will become augmented, and thereupon the regulator-pin 16 will continue to move to the right even after it has shut the valve 5. This it can do because the spring 11 of the cylinder 12 yields and permits the piston 10 thereof to move to the left. The effect of the regulator-pin continuing its motion to the right is to push the lower end of lever 7 into contact with head 26 of the pin or stem 25, whereby the valve 21 is opened against the action of spring 22 and air passes by pipes 19 and 20 to the wheel-chamber, thus destroying the vacuum and opposing sufficient resistance to the rotation of the turbine-wheel 2 as to properly reduce its speed.

It will be obvious from the foregoing that inasmuch as the valve 21 is open against the action of spring 22 the effect of the spring 22 is to move the valve 21 back to its seat whenever the regulator-pin 16 is retracted. This occurs of course when the speed of the turbine becomes reduced by the resistance of the admitted air and when, as already stated, the pin 16 will be moved inwardly or to the left by the action of the regulator-spring 37. As soon as the air-valve 21 is closed the steam leakage at the throttle continuing will again speed up the wheel, and again the pin 16, moving to the right, will open the air-valve 21 to admit air to reduce that speed. Thus the action of the device will always take place comformably to the rate of speed of the turbine—that is to say, as the speed increases the air-valve will be opened and as the speed correspondingly decreases the air-valve will be closed. It will be apparent therefore that the air-valve control, both in opening and closing in the manner stated, serves as a regulator for the speed of the wheel through its governing of the amount of air admitted to the vacuum-chamber.

I claim—

1. In combination with a steam-turbine and a vacuum-chamber inclosing the same, a valve constructed and arranged to admit air into said chamber and means for actuating said valve.

2. In combination with a steam-turbine and a vacuum-chamber inclosing the same, a valve constructed and arranged to admit air into said chamber and mechanism communicating with said turbine and controlling said valve to open the same to admit air into said chamber when said turbine shall have attained a predetermined speed of rotation.

3. In combination with a steam-turbine and a vacuum-chamber inclosing the same, a throttle-valve, an air-valve communicating with said vacuum-chamber and means actuated by said turbine for closing said throttle-valve and subsequently opening said air-valve.

4. In combination with a steam-turbine, a speed-regulator therefor, a throttle-valve controlled by said regulator, a vacuum-chamber inclosing said turbine, and a valve for admitting air into said chamber; the aforesaid parts being constructed and arranged so that the speed of rotation of said turbine beyond a certain fixed rate shall cause said regulator to shut said throttle and open said air-valve.

5. In combination with a steam-turbine, a speed-regulator therefor and actuated thereby, a throttle-valve controlled by said regulator, a vacuum-chamber inclosing said turbine and a valve for admitting air into said chamber; the aforesaid parts being constructed and arranged so that said regulator at a certain speed of rotation of said turbine shall operate to close the throttle, and thereafter at a certain higher speed of rotation of said turbine shall operate to open said air-valve.

6. In combination with a steam-turbine having a vacuum-chamber inclosing the same, a speed-regulator for said turbine having the pin 16, a throttle-valve controlled by said regulator, hollow block 18 communicating with said vacuum-chamber and means for opening the air-valve 21 constructed and arranged to be actuated by said regulator-pin 16.

7. In combination with a steam-turbine and a vacuum-chamber inclosing the same, means for admitting air into said chamber, and means for regulating said air-supply conformably to the speed of rotation of said turbine.

8. In combination with a steam-turbine and vacuum-chamber inclosing the same, a valve constructed to admit air into said chamber and means controlled by the rotation of said turbine for regulating the opening and closing of said valve.

9. In combination with a steam-turbine and a vacuum-chamber inclosing the same, a valve constructed and arranged to admit air into said chamber, a spring arranged to retain said valve in closed position and mechanism communicating with said turbine and controlling said valve to open the same to admit air into said chamber when said turbine shall have attained a predetermined speed of rotation.

In witness whereof I have hereunto signed my name in the presence of two subscribing witnesses.

GEORG OSCAR MAGNUS OLSSON.

Witnesses:

WALDEMAR BOMAN,

FRITZ FORSSBERG.